United States Patent [19]

Chion et al.

[11] Patent Number: 5,830,925

[45] Date of Patent: Nov. 3, 1998

[54] BITUMEN COMPOSITIONS AND A PROCESS FOR THEIR PREPARATION

[75] Inventors: Jacques Chion; Marie-Francoise Morizur, both of Grand Couronne, France

[73] Assignee: Shell Oil Company, Houston, Tex.

[21] Appl. No.: 752,989

[22] Filed: Nov. 21, 1996

[30] Foreign Application Priority Data

Dec. 11, 1995 [EP] European Pat. Off. ............. 95402789

[51] Int. Cl.$^6$ ....................................................... C08J 9/10
[52] U.S. Cl. ........................... 521/83; 521/101; 521/146; 521/148; 521/150; 524/62; 524/68
[58] Field of Search ............... 521/83, 101, 146, 521/148, 150; 524/68, 62

[56] References Cited

U.S. PATENT DOCUMENTS

| | | | |
|---|---|---|---|
| 2,807,596 | 9/1957 | Flickinger | 521/83 |
| 3,853,798 | 12/1974 | Oelsner et al. | |
| 4,010,123 | 3/1977 | Blunt et al. | 521/83 |
| 4,399,186 | 8/1983 | Lauderback | 156/78 |
| 4,511,679 | 4/1985 | Ariyoshi et al. | 521/101 |
| 4,609,695 | 9/1986 | Cogliano | 521/83 |
| 5,342,866 | 8/1994 | Trumbore et al. | |
| 5,405,882 | 4/1995 | Balnpied | 521/83 |

FOREIGN PATENT DOCUMENTS

WO 94/16019  7/1994  WIPO.

OTHER PUBLICATIONS

International Search Report May 16, 1997.

*Primary Examiner*—John M. Cooney, Jr.
*Attorney, Agent, or Firm*—Donald F. Haas

[57] ABSTRACT

The invention provides a process for preparing a bitumen composition comprising blowing a mixture with an oxygen-containing gas which mixture comprises a bitumen having a penetration of less than 300 and a thermoplastic rubber which is present in an amount of less than 5% w, based on total mixture; bitumen compositions obtainable by such process; and the use of such bitumen compositions in asphalt mixtures for road applications.

7 Claims, No Drawings

BITUMEN COMPOSITIONS AND A PROCESS FOR THEIR PREPARATION

FIELD OF THE INVENTION

The present invention relates to bitumen compositions, a process for their preparation, and the use of them in asphalt mixtures for road applications.

BACKGROUND OF THE INVENTION

Bitumen is used as a binder in road asphalt mixtures and has developed continually to meet ever-increasing performance demands of roadbuilding. In general bitumen performs well in road asphalt but increasingly heavy traffic loads have led to the premature wear of many roads through rutting and cracking of the surface. Cracking is a serious defect in an asphalt road because it allows water to reach lower layers of the road surface where it causes rapid deterioration and accelerates the need for premature repairs. Increasing the bitumen content of asphalt or using a softer grade of bitumen improves the crack resistance of asphalt at low temperatures but increases the risk of excessive rutting at higher temperatures because the mixture is effectively softer. Conversely, resistance of rutting can be improved by reducing the amount of bitumen in the asphalt mixture or by using a harder grade of bitumen at the expense of crack resistance because the mixture becomes less flexible.

In view of the above it will be clear that it would be very advantageous to develop a hard bitumen composition meeting today's crack resistance requirement, i.e. a bitumen composition having both a good low temperature performance and a good high temperature rutting resistance. It is known that the low temperature properties of bitumens can be improved by blending them with a polymer. However, when this modification is applied to hard bitumens, incompatibility between the bitumen and the polymer is generally observed, resulting in hardly or not improved low temperature properties and a relatively poor aging behavior.

It is further known to prepare industrial and roofing-grade bitumens by subjecting a bitumen/polymer mixture to a conventional blowing process. These bitumen compositions, however, appear to be not suitable for road applications due to their high softening point and relatively high penetration.

An object of the present invention is to provide a bitumen composition suitable for road applications having good low temperature performance, good high temperature rutting resistance, and improved aging behavior. Surprisingly, it has now been found that such bitumen composition can be prepared by subjecting a particular bitumen mixture to a blowing process.

SUMMARY OF THE INVENTION

Accordingly, the present invention relates to a process for preparing a bitumen composition comprising blowing a mixture with an oxygen-containing gas, which mixture comprises a bitumen having a penetration of less than 300 and a thermoplastic rubber which is present in an amount of less than 5 percent by weight (% w), based on preheated mixture.

Suitably, the thermoplastic rubber is present in an amount of less than 3% w, preferably in the range of from 1 to 3% w, based on preheated mixture. The bitumen in the preheated mixture has a penetration of less than 300 tenths of a millimeter (as measured by ASTM D 5 at 25° C. a load of 100 grams and a time of five seconds). Suitably, the bitumen has a penetration of less than 250, preferably less than 200 (as measured by ASTM D 5 at 25° C).

The blowing is carried out with an oxygen-containing gas, such as air or pure oxygen. Preferably, use is made of air. Suitably, the present process is carried out at a temperature in the range of 200° to 280° C. Preferably, the process according to the present invention is carried out at a temperature in the range of 210° to 260° C., more preferably of from 230° to 250° C.

The process according to the present invention may be carried out at ambient pressure or elevated pressure. Normally, however, it will be carried out at ambient pressure. Suitably, the present process is carried out over a period of time of less than 4 hours, preferably less than 3 hours, more preferably less than 2.5 hours.

DETAILED DESCRIPTION OF THE INVENTION

The mixture comprises a thermoplastic rubber. The mixture may comprise one or more different types of thermoplastic rubbers. Although a wide range of thermoplastic rubbers can suitably be used in accordance with the present invention, the preferred thermoplastic rubbers comprise optionally hydrogenated block copolymers which comprise at least two terminal poly(monovinylaromatic monomer) blocks and at least one central poly(conjugated diene) block forming a continuous network.

Preferably, block copolymer constituents are selected from the group s consisting of those of the formulae $A(BA)_m$ or $(AB)_n X$, wherein A represents a block of predominantly poly(monovinylaromatic monomer), wherein B represents a block of predominately poly(conjugated diene), wherein X represents the residue of a multivalent coupling agent and wherein n represents an integer $\geq 1$ and m represents an integer $\geq 3$. More preferably the blocks A represent predominantly lo poly(styrene) blocks and the B blocks represent predominantly poly(butadiene) or poly(isoprene). Multivalent coupling agents to be used include those commonly known in the art.

With the term "predominantly" is meant that the respective blocks A and B may be mainly derived from monovinyl aromatic monomer and conjugated diene, which monomers may be mixed with other structurally related or non-related co-monomers, e.g. mono-vinyl aromatic monomer as main component and small amounts (up to 10%) of other monomers or butadiene mixed with isoprene or with small amounts of styrene.

More preferably, the copolymers contain pure poly (styrene), pure poly(isoprene), or pure poly(butadiene) blocks, of which the poly(isoprene) or poly(butadiene) blocks may be selectively hydrogenated to at most a residual ethylenic unsaturation of 20% and most preferably less than 5%.

Most preferably the applied block copolymer has the structure ABA, wherein A has an apparent molecular weight (mol wt) of from 3000 to 100,000, preferably from 5000 to 20,000, and AB has an apparent mol wt of from 13,000 to 350,000, preferably from 35,000 to 120,000. The originally prepared poly(conjugated diene) blocks usually contain from 5 to 50 mol % vinyl groups originating from 1,2 polymerisation relative to the conjugated diene molecules, and preferably a vinyl content from 10 to 25%.

The complete block copolymer to be used according to the present invention normally contains polymerised vinyl aromatic monomers in an amount of from 10 to 60% by weight and preferably from 15 to 45% by weight. The apparent molecular weight of the total block copolymer will normally be in the range of from 20,000 to 350,000 and preferably in the range of from 40,000 to 200,000.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of the final coupled radial or star polymer is not as straightforward or as easy to make using GPC. This is because the radial or star shaped molecules do not separate and elute through the packed GPC columns in the same manner as do the linear polymers used for the calibration, and, hence, the time of arrival at a UV or refractive index detector is not a good indicator of the molecular weight. A good method to use for a radial or star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle and of polymer concentration using standard procedures. The differential refractive index (DRI) of the sample is measured at the same wavelength and in the same solvent used for the light scattering. The following references are herein incorporated by reference:

1. *Modern Size-Exclusion Liquid Chromatography*, W. W. Yau, J. J. Kirkland, D. D. Bly, John Wiley & Sons, New York, N.Y., 1979.
2. *Light Scattering from Polymer Solution*, M. B. Huglin, ed., Academic Press, New York, N.Y., 1972.
3. W. Kaye and A. J. Havlik, *Applied Optics*, 12, 541 (1973).
4. M. L. McConnell, *American Laboratory*, 63, May, 1978.

As examples of suitable pure block copolymers can be mentioned KRATON G-1651, KRATON G-1654, KRATON G-1657, KRATON G 1650, KRATON G 1701, CARIFLEXTR 1101, CARIFLEX TR 1102, CARIFLEX TR 1107, CARIFLEX TR 1184, CARIFLEX TR 1186, CARIFLEXTR 4113, CARIFLEX TR 4122, CARIFLEX TR 4260, CARIFLEX TR 4262, KRATON D-1101, KRATON D-1102, KRATON D-1107, KRATON D-1111, KRATON D-1116, KRATON D-1117, KRATON D-1118, KRATON D-1122, KRATON D-1135X, KRATON -1184, KRATON D-1144X, KRATON D-1300X, KRATON D-4141, and KRATON D-4158 polymers (KRATON and CARIFLEX are trademarks).

The bitumen may be a residue from distillation of crude oil, a cracked residue, a residue obtained by blowing a crude oil or residues of crude oil distillation or extracts of crude oils, a bitumen derived from propane bitumen, butane bitumen, pentane bitumen or mixtures thereof. Other suitable bitumens include mixtures of the above bitumens with extenders (fluxes) such as petroleum extracts, e.g. aromatic extracts, distillates or residues. Suitably, the bitumen applied has a softening point in the range of 35° to 65° C., preferably in the range of 42° to 58° C. (as measured by ASTM D 36).

One of the highly surprising and advantageous aspects of the present process is that now very attractive bitumen compositions can be prepared under mild conditions without requiring the presence of a bitumen blowing catalyst. The above-mentioned thermoplastic rubbers are preferably non-vulcanized thermoplastic rubbers. The use of non-vulcanized thermoplastic rubbers in accordance with the present invention has the advantage that attractive bitumen compositions can be prepared without requiring the presence of a vulcanizing agent. Therefore, the present process can suitably be carried out in the absence of a vulcanizing agent.

The mixture of bitumen and the thermoplastic rubber is normally preheated in a such way to establish an initial mixture temperature in the range of 160° to 220° C.

The present invention further provides a bitumen composition obtainable by any of the processes described hereinbefore. Such bitumen composition has suitably a penetration of less than 100, preferably less than 75 (as measured by ASTM D 5 at 25° C.), and a softening point in the range of 60° to 90° C., preferably in the range of 65° to 75° C. (as measured by ASTM D 36), and contains less than 5% w, preferably less than 3% w, and more preferably 1 to 3% w, of any one of the before-mentioned thermoplastic rubbers, based on total bitumen composition. Such bitumen compositions are very attractive since they display both a good low temperature performance and a good high temperature rutting resistance.

Fillers such as carbon black, silica and calcium carbonate, stabilisers, antioxidants, pigments, and solvents are known to be useful in bitumen compositions and can be incorporated in the compositions of this invention in concentrations taught in the art.

The present invention still further relates to the use of a bitumen composition as described hereinbefore in an asphalt mixture for road applications.

The present invention will now be illustrated by means of the following Examples.

EXAMPLES

Example 1

A mixture was prepared based on a 100 penetration bitumen (as measured by ASTM D 5 at 25° C.), an industrially produced non-naphthenic bitumen which is prepared from a crude oil by distillation. The bitumen had a penetration index of 0.5 and a softening point of 44° C. (as measured by ASTM D 36). To this bitumen was added 2% w of a block copolymer, based on total mixture. The block copolymer used was a hydrogenated polystyrene-polybutadiene-polystyrene block copolymer with a 30% w styrene content and a number average molecular weight of 103,000 as measured by GPC with a polystyrene standard. The ethylenic unsaturation of the polymer had been reduced to less than 1% of the original unsaturation by hydrogenation.

The mixture was prepared by blending the bitumen and the block copolymer at a temperature of 180° C. Subsequently, the preheated mixture so obtained was blown with air in a blowing vessel at a temperature of 220° C. during 2 hours. The main properties of the blown bitumen composition are shown in Table 1.

Example 2

A comparative blowing process was carried out in a similar way as described in Example 1 except that no thermoplastic rubber was added to the bitumen. The main properties of the blown bitumen are shown in Table 1.

The bitumen composition obtained was subjected to the Rolling Thin film Oven Test (ASTM test method D 2572).

The main properties of the bitumen composition after this aging test are shown in the bottom part of Table 1.

Example 3

A comparative blowing process was carried out in a similar way as described in Example 1 except that the block copolymer was added to the bitumen after the bitumen was blown. The main properties of the blown bitumen composition are shown in Table 1.

Example 4

A process was carried out in a similar way as described in Example 1 except that 1% w of the block copolymer was added to the bitumen, based on total mixture. The main properties of the blown bitumen composition are shown in Table 1.

The main properties of the bitumen composition after having been subjected to the RTFOT aging test are shown in the bottom part of Table 1.

From the results shown in Table 1 it will be clear that with the process according to the present invention (Examples 1 and 4) a hard bitumen composition can be prepared having an attractive low temperature elasticity, as shown by Fraass breaking point (as measured by IP 80), whereas with processes falling outside the present invention (Examples 2 and 3) less attractive hard bitumen products are obtained. Moreover, as will be clear from Examples 2 and 4, the present bitumen composition is more stable against thermal oxidation.

TABLE 1

| Example | 1 | 2 | 3 | 4 |
|---|---|---|---|---|
| Composition | | | | |
| thermoplastic rubber (% w) | 2 | 0 | 2 | 1 |
| Properties after 2 hours blowing at 220° C. | | | | |
| Penetration 25° C. (0.1 mm) | 24 | 20 | 16 | 25 |
| Softening Point Ring and Ball (°C.) | 67.5 | 65 | 81 | 63 |
| Penetration Index (−) | 0.7 | 0.0 | 1.9 | 0.1 |
| Fraass breaking point (°C.) | −13 | −5 | −2 | −10 |//

TABLE 1-continued

| Example | 1 | 2 | 3 | 4 |
|---|---|---|---|---|
| Properties after RTFOT aging | | | | |
| Penetration 25° C. (0.1 mm) | | 16 | | 21 |
| Retained Penetration (%) | | 80 | | 84 |
| Softening Point Ring and ball (°C.) | | 72 | | 65.5 |
| Softening Point increase (°C.) | | 7 | | 2.5 |
| Penetration Index (−) | | 0.7 | | 0.2 |
| Fraass breaking point (°C.) | | −3 | | −7 |

We claim:

1. A process for preparing a bitumen composition for use in an asphalt mixture for road applications and having a softening point of 75° C. or less comprising blowing a mixture with an oxygen-containing gas which mixture comprises a bitumen having a penetration of less than 300 tenths of a millimeter at 25° C., 100 grams, and 5 seconds and a thermoplastic rubber which is present in an amount of up to 3% w, based at on total mixture.

2. The process according to claim 1 wherein the thermoplastic rubber is present in an amount of 1 to 3% w, based on total mixture.

3. The process according to claim 1 wherein the mixture is blown with air.

4. The process according to claim 1 wherein the composition is prepared at a temperature in the range of 210° to 260° C.

5. The process according to claim 1 wherein the thermoplastic rubber comprises an optionally hydrogenated block copolymer which comprises at least two terminal poly(monovinylaromatic monomer) blocks and at least one central poly(conjugated diene) block.

6. The process according to claim 5 wherein the block copolymer has the formulae $A(BA)_m$ or $(AB)_nX$ wherein A represents a block of predominantly poly(monovinylaromatic monomer) and wherein B represents a block of predominantly poly(conjugated diene), wherein X represents the residue of a multivalent coupling agent and wherein n is an integer $\geq 3$ and m is an integer $\geq 1$.

7. The process according to claim 6 wherein the A blocks are predominantly poly(styrene) blocks and the B blocks are predominantly poly(butadiene) or poly(isoprene) blocks.

* * * * *